United States Patent [19]
Orme

[11] 3,942,550
[45] Mar. 9, 1976

[54] DUAL-ACTING RELIEF VALVE

[75] Inventor: Myrl E. Orme, Canoga Park, Calif.

[73] Assignee: The Bendix Corporation, North Hollywood, Calif.

[22] Filed: Aug. 2, 1974

[21] Appl. No.: 494,160

[52] U.S. Cl. ............................ 137/493; 137/596.12
[51] Int. Cl.² ......................................... F16K 17/18
[58] Field of Search ............. 137/493, 493.7, 493.8, 137/596.12, 596.13; 251/282, 63.4

[56] References Cited
UNITED STATES PATENTS

| | | | |
|---|---|---|---|
| 2,699,178 | 1/1955 | Adams et al. | 137/493 |
| 3,608,859 | 9/1971 | Hetzer | 251/282 X |
| 3,756,558 | 9/1973 | Okui | 251/282 |
| 3,792,715 | 2/1974 | Parrett et al. | 137/493 |
| 3,827,336 | 8/1974 | Caywood et al. | 137/596.12 X |

Primary Examiner—Martin P. Schwadron
Assistant Examiner—Robert J. Miller
Attorney, Agent, or Firm—Robert C. Smith; William F. Thornton

[57] ABSTRACT

A dual-acting relief valve is shown which senses fluid pressure above a desired amount in either of two control conduits and operates to interconnect the conduits, thus permitting a higher pressure to be vented to the lower pressure. The two conduits are interconnected by means of an intersecting chamber containing a ported sleeve and either a poppet valve on a stem or a slide valve in association with an isolation piston axially movable in the sleeve for interrupting communication between the conduits. One end of the isolation piston is connected to sense the pressure in one of the conduits, which pressure is opposed by a spring located in a chamber connected to return fluid pressure and thus isolated from control pressure. A bore internal of the valve stem connects the other control conduit with a chamber between the isolation piston and the valve stem. Thus, pressures in excess of spring pressure in the first conduit will act against the isolation piston to move it and the valve member in a direction to interconnect the control conduits. Overpressures in the second conduit are sensed through the bore internal of the valve stem, grounding the isolation piston and forcing the valve member in the same direction as before to interconnect the two control conduits.

14 Claims, 2 Drawing Figures

DUAL-ACTING RELIEF VALVE

BACKGROUND OF THE INVENTION

In a control system wherein a hydraulic servo valve is used to control the operation of a hydraulic motor, there will be a pair of hydraulic conduits or lines connecting the servo valve to the hydraulic motor. Sometimes it is necessary that these two hydraulic lines be connected to relief valve structure. The conventional manner of implementing this arrangement is to provide a separate relief valve in each line capable of venting the line to return fluid pressure. Where displacement of the associated hydraulic motor is quite limited, it is inevitable that the amount of fluid involved in the associated lines and the relief valve structure exerts a powerful effect on the effective spring rate of the system. Sometimes this change in spring rate may be sufficient to cause the system to oscillate. In addition to the problems introduced by adding the volume of operating fluid required for two separate relief valve structures and their associated springs and spring chambers, such an arrangement also requires greater space and weight and may result in some variations in threshold pressure from line to line should the individual springs vary somewhat in their rates.

DESCRIPTION OF THE PREFERRED EMBODIMENT

Figure 1:
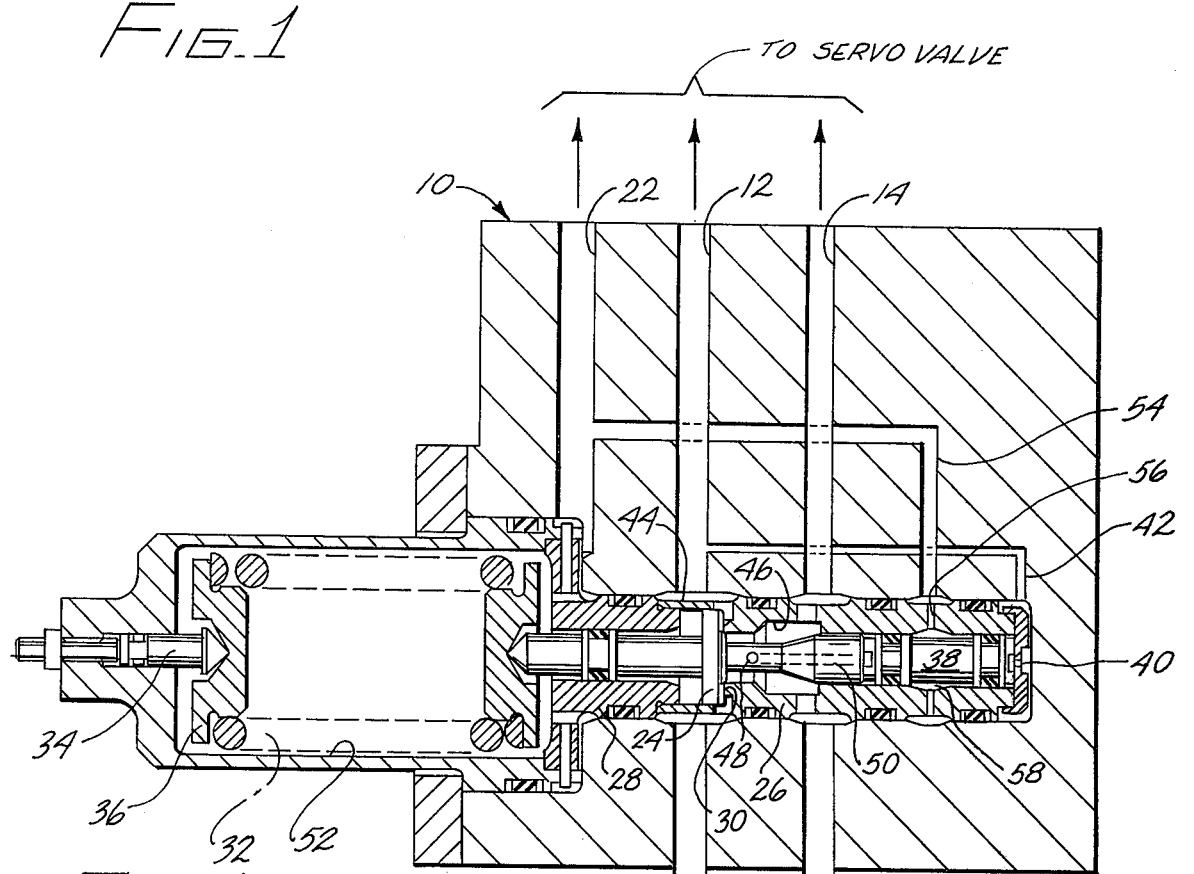
FIG. 1 is a schematic drawing showing a dual-acting relief valve made according to my invention in conjunction with a typical hydraulic motor.

Referring now to FIG. 1, my dual-acting relief valve is shown located in a housing 10 including first and second fluid control conduits 12 and 14 connected to opposite sides of a hydraulic motor cylinder 16. Within cylinder 16 is a piston 18 carrying a linear actuator shaft 20. Shaft 20 may be connected to a control surface or other device whose position is to be controlled. Also in housing 10 is a return line conduit 22, all of conduits 12, 14 and 22 being connected to a conventional servo valve which responds to input signals or forces to control the pressure of the fluid in conduits 12 and 14 to control the position of piston 18 and shaft 20. Such servo valves are conventional in the art, a typical such valve being shown in the patent to D. V. Healy, U.S. Pat. No. 3,095,002. While the valve shown in this patent is operated by means of an electrical torque motor, the actuating means plays no part in the present invention and other actuating means or manual means may be employed.

In the system shown, a balanced poppet valve member 24 is positioned within a sleeve 26 and an extension thereof 28 which also serves as a manifold (as further discussed below), valve member 24 being held on its seat 30 by means of a spring 32 plus the fluid pressure in the spring cavity acting on the exposed area of the poppet. The desired opening pressure for poppet 24 is obtained by adjusting spring 32 with an adjusting screw 34 acting against a retainer 36.

Also placed within the interior of the ported sleeve 26 and preferably manufactured to the same diameter as the poppet shaft is an isolation piston 38. The right hand end of piston 38 communicates through an orifice 40 with a passage 42 connected to fluid pressure conduit 12. Thus, fluid in conduit 12 is ported from the control valve through the relief valve cavity 44 to the actuator and also through passage 42 and orifice 40 to the end of the isolation piston 38.

The poppet value member 24 also includes a radial port 48 intersecting an axial bore 50 which communicates with the left end of the isolation piston 38. Thus, fluid in control conduit 14 enters into a chamber 46 in the interior of sleeve member 26 from whence it enters port 48 and bore 50 and exerts pressure in a chamber between the isolation piston 38 and the poppet member 24. At the same time, it continues through line 14 to one side of the actuator piston 18. This pressure urges poppet member 24 toward the left against the force of spring 32.

Connected to return line 22 are passages in member 28 which communicate with a chamber 52 in which spring 32 is located. Also connected to passage 22 is a return passage 54 which is connected through an orifice 56 to a chamber 58 positioned between seals on piston 38 to maintain chamber 58 at return pressure. This arrangement avoids exposing the seals on piston 38 to alternating forces which would cause them to wear rapidly. In considering operation of the described device, assume that pressure in pressure conduit 12 is high. This causes high pressure in conduit 42 to be communicated to the right end of isolation piston 38. This pressure being high, it overcomes the force of spring 32 causing isolation piston 38 to move toward the left, carrying poppet member 24 off of seat 30. This vents pressure in conduit 12 toward conduit 14 through the chamber 46. Should pressure be high in conduit 14, this high pressure will be communicated through the port 48 and axial bore 50 such that it acts between poppet 24 and isolation piston 38, grounding piston 38 toward the right and causing the poppet 24 to move toward the left against the force of spring 32 as previously described. This again will result in opening communication between conduits 12 and 14, in this case resulting in the higher pressure from conduit 14 being vented across the seat 30 toward conduit 12. Thus, the poppet member 24 will move to the left, irrespective of which conduits 12 or 14 may carry pressure above the threshold value established by the compression of spring 32. It will be recognized that with this arrangement the hydraulic conduits 12 and 14 are separated, and yet pressures in these lines react on equal areas and move the poppet member 24 off of seat 30 at the same pressure differential, irrespective of which pressure may be above the threshold value. It will be observed that relief valve operation requires only a very small amount of additional fluid in the system including the small columm of fluid in chamber 46 between the conduits 12 and 14. The comparatively large volume of fluid in the spring chamber is effectively isolated from the dynamics of the system by being connected to the return line.

Figure 1A:
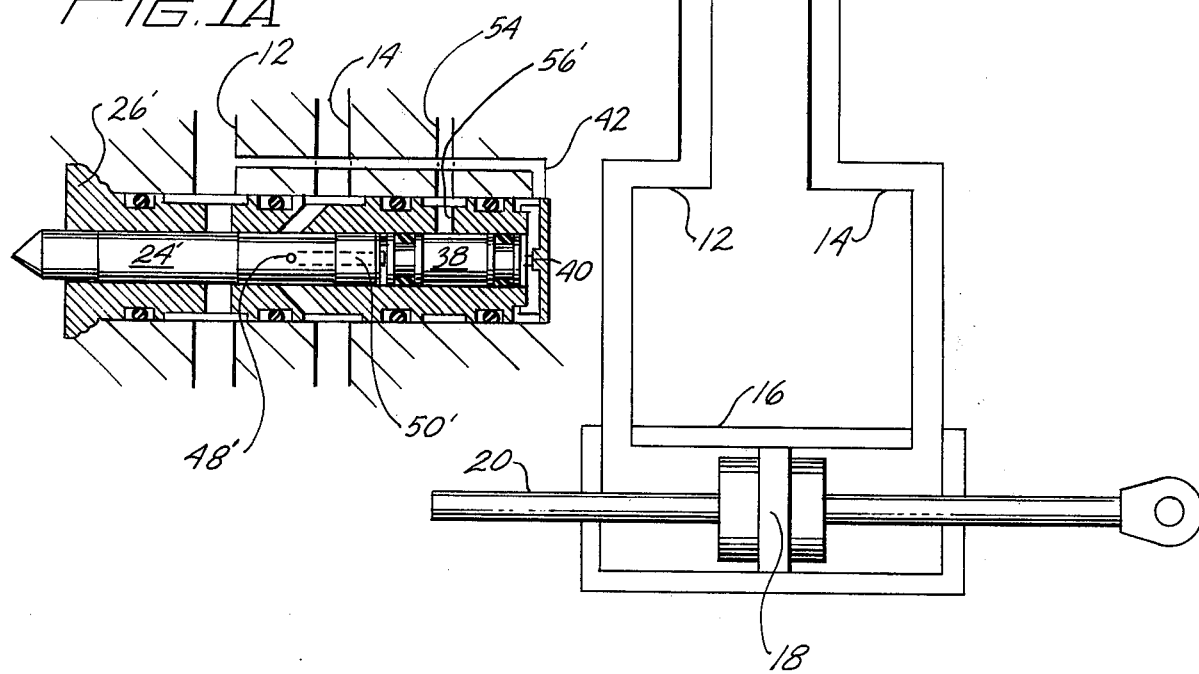
FIG. 1a shows a schematic view of an optional slide valve arrangement which could be used in connection with the system of FIG. 1.

While a poppet valve arrangement such as that shown in FIG. 1 is preferred, for some applications it may be desirable to use a slide valve arrangement such as that shown in FIG. 1a. In this figure, the valve structure fits into housing 10 in exactly the same manner as shown in FIG. 1. Similar parts have been given similar numerals, and parts which vary somewhat have been given similar numerals primed. Thus, control conduits 12 and 14 are identical to those shown in FIG. 1 as are passageways 42, 54, and orifice 40. Isolation piston 38 is, or may be, identical to that shown in FIG. 1, and its center is also connected through a passageway 56' to passageway 54 and thence to return. The slide valve 24' also includes the radial port 48' and an axial bore 50' communicating with a chamber between valve member 24 and piston 38. As shown, slide valve member 24' effectively blocks communication between conduits 12 and 14. The pressure in conduit 12 in excess of the desired reference value is communicated through passage 42 and the orifice 40 to the right end of isolation piston 38, thus causing both piston 38 and slide valve member 24' to move toward the left until communication is effected between conduits 12 and 14. Similarly, should the pressure in conduit 14 be high, this pressure is communicated through the radial port 48' and the axial bore 50' to the chamber between isolation piston 38 and the slide valve 24', thus grounding isolation piston 38 and moving slide member 24' toward the left, again providing communication between conduits 12 and 14 and permitting the excess pressure in conduit 14 to be vented into conduit 12.

Modifications will become apparent to those skilled in the art. While it is highly desirable that poppet 24 be a balanced poppet, at least for the application with which applicant was concerned, other requirements may not require that this poppet be balanced, and a differential in area may be used as a means of providing a different venting threshold from one conduit to another. While the fluid in the spring cavity 52 is normally at return pressure, this may not be required for other applications. By changing the exposed diameters and thus the areas of the poppet exposed, the system could be referenced to a pressure other than return pressure. However, it is desirable that the pressure in the spring cavity 52 be a low pressure which is effectively isolated from the control pressures in conduits 12 and 14. And while the poppet valve arrangement shown in FIG. 1 is preferred, the slide valve arrangement as shown in FIG. 1a may also be used. From the foregoing, it will be appreciated that applicant has devised a dual-acting relief valve structure in which the relief valve function is accomplished through a single spring which is located in a chamber whose fluid pressure is isolated from the control pressures and in which the pressures in each of the two controlled lines may be vented to the other through the addition of a minimal amount of operating fluid. In this manner, the relief valve has a minimal effect on the dynamics of the entire system and avoids the oscillation problem referred to above.

I claim:

1. A dual-acting relief valve comprising
a housing,
first and second fluid conduits in said housing,
a chamber in said housing intersecting said conduits,
a sleeve in said chamber having a hollow interior and ports communicating said fluid conduits with said interior and including a valve seat,
a spool valve member and an isolation piston in said sleeve with a poppet carried on said spool valve and a second chamber between said valve member and said piston,
resilient means urging said spool valve in a direction such that said poppet is held against said seat, thus blocking communication between said first and second fluid conduits,
means communicating the fluid pressure in said first fluid conduit to the end of said isolation piston opposite said resilient means such that said pressure acting on said piston through said spool valve member tends to move said poppet off said seat, and
means communicating the fluid pressure in said second fluid conduit to said second chamber such that said pressure acting on said spool valve member tends to move said poppet off said seat, whereby upon the occurrence of pressures in either said first and second fluid conduits greater than desired, said poppet is moved off said seat to vent the higher of the pressures in said fluid conduits to the lower.

2. A dual-acting relief valve as set forth in claim 1 wherein said resilient means is a spring and means are provided for varying the force exerted by said spring.

3. A dual-acting relief valve as set forth in claim 1 wherein said first and second fluid conduits are placed in close proximity to each other whereby the amount of fluid in said bore between said conduits is minimized.

4. A dual-acting relief valve as set forth in claim 1 wherein said second passageway includes a bore through said spool valve to said second chamber.

5. A dual-acting relief valve as set forth in claim 1 wherein said land on said spool valve is a balanced poppet.

6. A dual-acting relief valve as set forth in claim 1 wherein the area of said isolation piston acted upon by the pressure from said first fluid conduit equals the area of said spool valve acted upon by the pressure in said second fluid conduit.

7. For use in a hydraulic control system including a hydraulic motor having first and second control fluid conduits connected thereto, a source of fluid under pressure and a low pressure source and control means for connecting said first and second fluid conduits to the desired ones of said sources;
a dual-acting relief valve connected to said first and second fluid conduits comprising a housing having a chamber therein in communication with said fluid conduits,
a sleeve member in said chamber having an elongated bore therethrough, ports connecting said fluid conduits with said bore, and a valve seat,
a spool valve member having a land and an isolation piston in said bore with a second fluid chamber positioned therebetween,
resilient means normally biasing said spool member such that said land is held in position to prevent communication between said first and second fluid conduits,
a first passageway connecting said pressure from said first fluid conduit with one end of said isolation piston such that said pressure tends to move said isolation piston and said spool valve in a first direction to move said land to permit communication between said first and second fluid conduits,
a second passageway communicating pressure from said second fluid conduit to said second fluid chamber such that pressure in said second fluid chamber tends to move said spool valve in said first direction and said isolation piston in the opposite direction,
whereby fluid pressures in either of said first and second fluid conduits are connected to the opposite of said conduits when they exceed a desired value.

8. A dual-acting relief valve as set forth in claim 7 wherein said first and second fluid conduits are placed in close proximity to each other whereby the amount of fluid in said bore between said conduits is minimized.

9. A dual-acting relief valve as set forth in claim 8 wherein a third chamber is provided connected to said low pressure source and said resilient means is located in said third chamber.

10. A dual-acting relief valve as set forth in claim 8 wherein said resilient means is a spring and means are provided for varying the force exerted by said spring.

11. A dual-acting relief valve as set forth in claim 8 wherein said second passageway includes a bore through said spool valve to said second chamber.

12. A dual-acting relief valve as set forth in claim 7 wherein said land on said spool valve is a balanced poppet.

13. A dual-acting relief valve as set forth in claim 8 wherein the areas of said isolation piston and said spool valve acted upon by the pressure in said second chamber are the same.

14. A dual-acting relief valve as set forth in claim 8, wherein the area of said isolation piston acted upon by the pressure from said first fluid conduit equals the area of said spool valve acted upon by the pressure in said second fluid conduit.

\* \* \* \* \*